(12) United States Patent
Peterseim et al.

(10) Patent No.: US 11,435,478 B2
(45) Date of Patent: Sep. 6, 2022

(54) LIDAR SYSTEM AND METHOD FOR OPERATING A LIDAR SYSTEM

(71) Applicant: Robert Bosch GmbH, Stuttgart (DE)

(72) Inventors: Tobias Peterseim, Boeblingen (DE); Annemarie Holleczek, Stuttgart (DE); Nico Heussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 16/499,905

(22) PCT Filed: Mar. 27, 2018

(86) PCT No.: PCT/EP2018/057763
§ 371 (c)(1),
(2) Date: Oct. 1, 2019

(87) PCT Pub. No.: WO2018/184913
PCT Pub. Date: Oct. 11, 2018

(65) Prior Publication Data
US 2020/0116864 A1  Apr. 16, 2020

(30) Foreign Application Priority Data

Apr. 3, 2017  (DE) .......................... 102017205619.3

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4814* (2013.01); *G01S 7/499* (2013.01); *G01S 7/4802* (2013.01)

(58) Field of Classification Search
CPC ........ G01S 17/42; G01S 7/4814; G01S 7/499; G01S 7/4802; G01S 17/931
See application file for complete search history.

(56) References Cited

U.S. PATENT DOCUMENTS 9,477,007 B2 * 10/2016 Albert ..................... G01S 17/93
10,627,516 B2 * 4/2020 Eichenholz ........... G01S 17/931
(Continued)

FOREIGN PATENT DOCUMENTS

DE        2656131 A1     6/1977
DE      202012010014 U1   1/2014
(Continued)

OTHER PUBLICATIONS

International Search Report for PCT/EP2018/057763, dated Jun. 22, 2018.

*Primary Examiner* — Roy M Punnoose
(74) *Attorney, Agent, or Firm* — Norton Rose Fulbright US LLP; Gerard Messina

(57) ABSTRACT

A LIDAR system, including a transmitting unit that includes a polarization device, the polarization device being configured to set a polarization of a scanning beam, a receiving unit that is configured to receive the scanning beam after it has been reflected on a point in the surroundings of the LIDAR system, the receiving unit including a polarization recognition device that is configured to recognize a polarization of the reflected scanning beam, and an evaluation unit that is configured to ascertain a polarization difference, based on a difference between the polarization that is set by the transmitting unit and the polarization that is recognized by the receiving unit.

11 Claims, 3 Drawing Sheets

(51) Int. Cl.
  *G01S 7/499*  (2006.01)
  *G01S 7/48*   (2006.01)

(56) References Cited

U.S. PATENT DOCUMENTS

| | | | |
|---|---|---|---|
| 2012/0026497 A1* | 2/2012 | Mathur | G01N 21/47 |
| | | | 356/342 |
| 2012/0075432 A1 | 3/2012 | Bilbrey et al. | |
| 2014/0111805 A1* | 4/2014 | Albert | G01S 17/93 |
| | | | 356/369 |
| 2020/0064479 A1* | 2/2020 | Holleczek | G01S 7/4861 |

FOREIGN PATENT DOCUMENTS

| | | | | |
|---|---|---|---|---|
| DE | 102013219344 A1 | 3/2015 | | |
| DE | 102015200027 A1 | 7/2016 | | |
| DE | 202015101912 U1 | 7/2016 | | |
| DE | 202016005126 U1 | 11/2016 | | |
| DE | 102017204586 A1 * | 9/2018 | ............. | G01S 17/42 |
| EP | 2477044 A2 * | 7/2012 | ............. | G01S 17/95 |
| EP | 2722684 A1 | 4/2014 | | |
| JP | H08136455 A | 5/1996 | | |
| JP | H09170983 A | 6/1997 | | |
| JP | 2003057168 A | 2/2003 | | |
| JP | 2010104424 A | 5/2010 | | |
| JP | 2013160717 A | 8/2013 | | |
| JP | 2018151277 A | 9/2018 | | |

\* cited by examiner

LIDAR SYSTEM AND METHOD FOR OPERATING A LIDAR SYSTEM

FIELD OF THE INVENTION

The present invention relates to a LIDAR system and a method for operating a LIDAR system.

BACKGROUND INFORMATION

Present LIDAR systems in the automotive sector do not carry out material recognition, and thus do not allow conclusions to be drawn concerning surface characteristics of objects that are detected by the LIDAR system.

Thus far, it has not been possible to carry out a reliable investigation of surface characteristics of objects as additional information for object recognition itself. However, information about the surface characteristics of objects would be helpful to allow enhanced object recognition and/or to carry out plausibility checking of objects.

For this purpose, DE 102013219344 A1 refers to a LIDAR system that includes a polarization-modulated scanning beam.

SUMMARY OF THE INVENTION

The LIDAR system according to the present invention includes a transmitting unit that includes a polarization device, the polarization device being configured to set a polarization of a scanning beam, a receiving unit that is configured to receive the scanning beam after it has been reflected on a point in the surroundings of the LIDAR system, the receiving unit including a polarization recognition device that is configured to recognize a polarization of the reflected scanning beam, and an evaluation unit that is configured to ascertain a polarization difference, based on a difference between the polarization that is set by the transmitting unit and the polarization that is recognized by the receiving unit.

The method according to the present invention for operating a LIDAR system includes setting a polarization of a scanning beam of the LIDAR system, receiving the scanning beam after it has been reflected on a point in the surroundings of the LIDAR system, recognizing a polarization of the reflecting scanning beam, and ascertaining a polarization difference based on a difference between the set polarization of the scanning beam and the recognized polarization of the scanning beam, which the scanning beam has after it has been reflected on a point in the surroundings of the LIDAR system.

The polarization device is thus a device that influences a polarization of a scanning beam in such a way that the polarization of the scanning beam is set to a certain state that is known. For this purpose, either the scanning beam passes through the polarization device, or the polarization device generates the scanning beam. The polarization recognition device is a device that is configured to recognize a polarization of the reflected scanning beam. This means that the polarization recognition device is suitable for receiving the scanning beam when it is reflected back from the surroundings of the LIDAR system, in order to then ascertain the polarization of the scanning beam. The polarization recognition device thus outputs a value that describes the polarization of the reflected scanning beam. The evaluation unit may be an analog or digital electronics system. The evaluation unit ascertains a difference between the polarization that is set by the transmitting unit and the polarization that is recognized by the receiving unit. In other words, this means that the polarization difference describes a change in the polarization of the scanning beam that the scanning beam undergoes due to its reflection on the point in the surroundings of the LIDAR system.

Thus, the LIDAR system detects an additional parameter which describes an object that describes the point in the surroundings of the LIDAR system on which the scanning beam has been reflected.

The further descriptions set forth refinements of the present invention.

The evaluation unit may also be configured to ascertain a surface property, based on the polarization difference. A surface property is any parameter that characterizes a surface of the object on which the scanning beam has been reflected in the surroundings of the LIDAR system. Thus, a surface property is a surface characteristic, for example. In this way it is possible, among other things, to recognize a material of which an object is made, which includes the point on which the scanning beam has been reflected.

It further may be provided that the transmitting unit sets the polarization of the scanning beam to a first polarization and to a second polarization in a temporal sequence. This means that the polarization device varies the polarization of the scanning beam. Additional information about the surface property may thus be obtained, since an influence by the object on which the scanning beam is reflected in the surroundings of the LIDAR system may be detected at different polarizations.

The evaluation unit may also be configured to associate a polarization parameter, which describes the polarization difference, with the point in the surroundings of the LIDAR system on which the scanning beam has been reflected. A LIDAR system typically detects a so-called point cloud that describes a position of reflection points, and thus objects, in the surroundings of the LIDAR system. This means that a plurality of points is detected that describes the surroundings of the LIDAR system. Each point is defined by its position. Such a definition is made in a coordinate system, for example. The position of each point as well as a polarization parameter are associated with each of these points. By use of these additional parameters, it is possible, for example, to identify individual objects from the surroundings of the LIDAR system.

The evaluation unit may be configured to ascertain the polarization parameter, based on the polarization differences between two adjacent points, from the surroundings of the LIDAR system. It is particularly advantageous when the adjacent points have been detected in a temporal sequence, a first point having been scanned with the aid of a set first polarization, and a second point having been scanned with the aid of a set second polarization. This means that the polarization device has set different polarizations of the scanning beam during scanning of the first point and during scanning of the second point. On this basis it may be assumed that adjacent points are very likely to belong to the same object, and additional information may thus be obtained that describes a surface property of the object particularly well.

It may further be provided that the polarization device includes a polarization filter, a Pockels cell, or a lambda quarter-wave plate to set the polarization of the scanning beam. The polarization device may thus have a particularly cost-effective and robust configuration.

It is also advantageous when the polarization device includes a movable element through which the scanning beam passes, the movable element being moved with respect to the scanning beam in order to set the polarization of the scanning beam. It is thus particularly advantageous when the scanning beam is passed through a polarization filter, and the polarization filter thus rotates. By use of a movable element, the polarization of the scanning beam may be easily set with the aid of the movement. It is possible in particular to select and thus set a plurality of possible polarizations.

In addition, it is advantageous when the polarization device is a component having a variable thickness, one area having a first thickness and one area having a second thickness being situated next to one another. The polarization device may be situated in such a way that the scanning beam swivels via the polarization device during a scanning operation of the LIDAR system. This allows the polarization of the scanning beam to be set to different values without the need for a mechanical movement in the polarization device.

It is advantageous when the polarization device is a component that includes different coatings, an area with a first coating being situated next to an area with a second coating or an uncoated area. The coating is a coating that affects a polarization of the scanning beam. The polarization device may be situated in such a way that the scanning beam is moved via the polarization device during a scanning operation of the LIDAR system. A changeable polarization of the scanning beam may thus be provided without the need for a mechanical movement of the polarization device. In addition, it is thus possible to set the polarization of the scanning beam to a first polarization and to a second polarization in a temporal sequence. In addition, it may thus be ensured that a different polarization of the scanning beam is set for adjacent points from the surroundings of the LIDAR system; i.e., the scanning beam has the first polarization when it strikes one of the adjacent points, and the scanning beam has the second polarization when it strikes the other of the adjacent points. Since the scanning beam in present LIDAR systems is usually swiveled anyway for the scanning operation, which is achieved in particular with the aid of a rotating or oscillating mirror, a particularly simple implementation of the polarization device is thus possible.

It is advantageous when the polarization recognition device includes a polarizing beam splitter. The polarization of the scanning beam may thus be recognized in a particularly simple manner. In particular, the reflected scanning beam is separated into a first component and into a second component, the two components each being a component having a predefined polarization, the polarizations of the two components may be orthogonal to one another. Thus, it is sufficient to measure a signal strength of the two components in order to deduce the polarization of the reflected scanning beam.

Furthermore, it is advantageous when the evaluation unit is configured to carry out a grouping of points detected in the surroundings of the LIDAR system, based on the polarization parameters associated with the points. It is thus possible, for example, to combine points having polarization parameters in a similar value range. This makes it possible to define areas having the same surface properties, from which an association with a certain object may be deduced.

Exemplary embodiments of the present invention are described in greater detail below with reference to the appended drawings.

DETAILED DESCRIPTION

Figure 1:
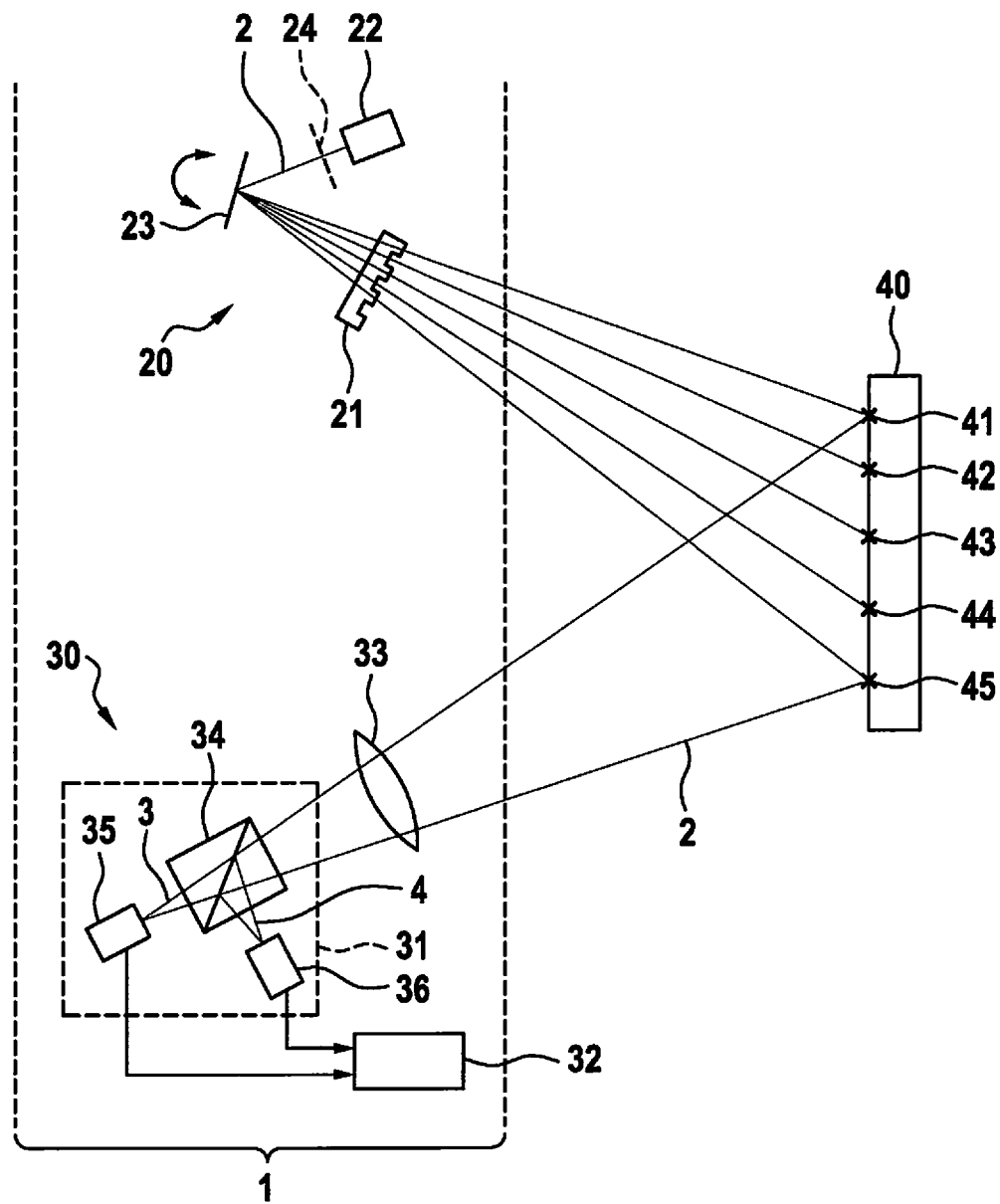
FIG. 1 shows a schematic illustration of a LIDAR system according to a first specific embodiment of the present invention.

FIG. 1 shows a LIDAR system 1 according to the present invention according to a first specific embodiment of the present invention. LIDAR system 1 includes a transmitting unit 20 and a receiving unit 30. Receiving unit 30 includes an evaluation unit 32.

Transmitting unit 20 includes a beam source 22 that generates a scanning beam 20. Beam source 22 is a laser. Accordingly, scanning beam 2 is a laser beam.

Transmitting unit 20 also includes a mirror 23. Mirror 23 is an oscillating micromirror. Beam source 22 is oriented in such a way that scanning beam 2 strikes mirror 23. Since mirror 23 oscillates, scanning beam 2 is deflected in different directions. Scanning beam 2 is thus moved, and scans the surroundings of LIDAR system 1 as soon as it exits LIDAR system 1.

Transmitting unit 20 also includes a polarization device 21. Polarization device 21 is configured to set a polarization of scanning beam 2. In this first specific embodiment, polarization device 21 is a component that has a variable thickness, one area having a first thickness and one area having a second thickness being situated next to one another. For this purpose, polarization device 21 is configured as a disk that includes areas, extending in parallel, with different thicknesses. This is also apparent in FIG. 1.

The thickness is a distance between two surfaces of a disk-shaped polarization device 21, which are opposite sides of disk-shaped polarization device 21. The different thicknesses are achieved, for example, by arranging multiple spaced-apart lambda quarter-wave plates on a surface of a disk or plate having a constant thickness. Thus, a thin area adjoins a thick area of polarization device 21. Polarization device 21 shown in FIG. 1 includes three thin areas and four thick areas. Thus, in each case an area having a first thickness and an area having a second thickness are situated next to one another in alternation. Polarization device 21 is oriented with respect to scanning beam 2 in such a way that during a scanning operation, the scanning beam passes in alternation through an area having a first thickness and an area having a second thickness.

The areas of different thicknesses result in a different change in polarization of scanning beam 2 in the areas having a first thickness compared to the areas having a second thickness. Since beam source 22 is a laser, it emits polarized light. This uniformly polarized light is thus polarized differently, as a function of a location at which the scanning beam passes through plate-shaped polarization device 21. This is an indirect function of a position of mirror 23.

If beam source 22 is not a laser, or does not emit polarized light for whatever reason, it is also advantageous for a polarization filter 24 to be situated between beam source 22 and polarization device 21, the polarization filter allowing uniform polarization of scanning beam 2 before it enters polarization device 21.

As an alternative to the areas having a first thickness and the areas having a second thickness, it is also possible for areas with a first coating and areas with a second coating to be situated on plate-shaped polarization device 21. The coating is selected in such a way that it changes the polarization of scanning beam 2. It is also possible to apply the different coatings on a surface of a polarization device 21, which likewise includes areas having a first thickness and areas having a second thickness. Thus, for example, polarization device 21 illustrated in FIG. 1 could be configured in such a way that the areas having a large thickness include a coating, and the areas having a small thickness include a different coating or no coating.

Scanning beam 2 pivots due to a movement of mirror 23 via polarization device 21. Thus, the scanning beam strikes, in alternation, areas that change the polarization of scanning beam 2 differently. As a result, transmitting unit 20 sets the polarization of scanning beam 2 in a temporal sequence that alternates between a first polarization and a second polarization. Thus, the polarization of scanning beam 2 is set, for example, to a first polarization in the thick areas, and to a second polarization in the thin areas, of polarization device 21.

In FIG. 1, scanning beam 2 is reflected by an object 40 in the surroundings of LIDAR system 1 and reflected back to LIDAR system 1. Reflected scanning beam 2 is received by receiving unit 30 of LIDAR system 1. Reflected scanning beam 2 is focused by a lens 33 onto a polarizing beam splitter 34. Polarizing beam splitter 34 splits scanning beam 2 into a first component 3 and into a second component 4. First component 3 and second component 4 have different polarizations. First component 3 is deflected onto a first sensor 35. Second component 4 is deflected onto a second sensor 36. First sensor 36 and second sensor 35 measure a signal strength of the particular component of scanning beam 2. The polarization of reflected scanning beam 2 may be recognized based on a ratio of the signal strengths that are measured by the two sensors 35, 36. The two sensors 35, 36 together with polarizing beam splitter 34 form a polarization recognition device 31.

The output values of the two sensors 35, 36 are conveyed to evaluation unit 32, via which the polarization of reflected scanning beam 2 is thus known. In addition, evaluation unit 32 is provided with an instantaneous position of mirror 23, which is detected with the aid of a position sensor, for example. The polarization of scanning beam 2 to which the scanning beam has been set with the aid of polarization device 21 is a function of the position of mirror 23. Thus, based on the position of mirror 23, evaluation unit 32 may ascertain the polarization of scanning beam 2 when it is emitted by LIDAR system 1. At the same time, evaluation unit 32 determines the polarization of the reflected scanning beam, based on output signals of sensors 35, 36. Evaluation unit 32 ascertains a difference between the polarization that is set by transmitting unit 20 and the polarization that is recognized by receiving unit 30. Evaluation unit 32 thus computes the way in which the polarization of scanning beam 2 has been changed by a reflection on object 40. Since object 40 is scanned point by point by LIDAR system 1, during swiveling of scanning beam 2 over object 40, for each point of object 40 on which scanning beam 2 has been reflected, evaluation unit 32 computes a difference between the polarization that is set by transmitting unit 20 and the polarization that is recognized by receiving unit 30.

In the example shown in FIG. 1, scanning beam 2 has been reflected on a first point 41, a second point 42, a third point 43, a fourth point 44, and a fifth point 45 on object 40. The distance between points 41 and 45 results from an operating frequency of receiving unit 30.

LIDAR system 1 is suitable for carrying out a time-of-flight measurement in order to ascertain a distance of first through fifth points 41 through 45 from LIDAR system 1, and also to ascertain a direction in which first through fifth points 41 through 45 of object 40 are situated with respect to LIDAR system 1. In other words, a position of first through fifth points 41 through 45 with respect to LIDAR system 1 is thus ascertained. Evaluation unit 32 is configured to associate a polarization parameter with each of points 41 through 45 from the surroundings of LIDAR system 1, which describes the polarization difference. Thus, the manner in which the polarization of scanning beam 2 has been changed at each of points 41 through 45 situated on object 40 is stored. In this first specific embodiment, the polarization parameter is a digital value that is provided by evaluation unit 32. For the time-of-flight measurement, a synchronization of an emission of scanning beam 2 by beam source 22 may take place, the points in time of the emission of scanning beam 2 being set in such a way that scanning beam 2 is emitted in each case in such a way that it has a constant polarization for the time period of the emission. For this purpose, the beam source is controlled, for example, based on output values of the position sensor of mirror 23, so that during a transmission pulse, scanning beam 2 passes only through an area having a first thickness or only through an area having a second thickness, of polarization device 21.

FIG. 1 only illustrates a single object 40 in the surroundings of LIDAR system 1. In practice, scanning beam 2 is reflected on a plurality of different objects and reflected back to receiving unit 30 of LIDAR system 1. As a result, LIDAR system 1 detects a so-called point cloud that describes a position of a plurality of points in the surroundings of LIDAR system 1 with respect to LIDAR system 1. Associated with each of the points in this point cloud is a polarization parameter that describes how the polarization of scanning beam 2 has changed during the reflection of scanning beam 2 on the particular point.

A grouping of points of the point cloud is carried out during a further evaluation of this point cloud. The evaluation unit groups points that have a similar polarization parameter. Thus, for example, points are grouped that are adjacent to one another and whose polarization parameters differ from one another by less than a predefined threshold value. A grouping is thus carried out based on associated polarization parameters of the points. For such points that have been grouped in a shared group, it is assumed that these points belong to the same object.

Based on the polarization parameter, and thus, based on the polarization difference, evaluation unit 32 ascertains surface properties that describe object 40 on which scanning beam 2 has been reflected. In this regard, reference is made to FIG. 2.

Figure 2:
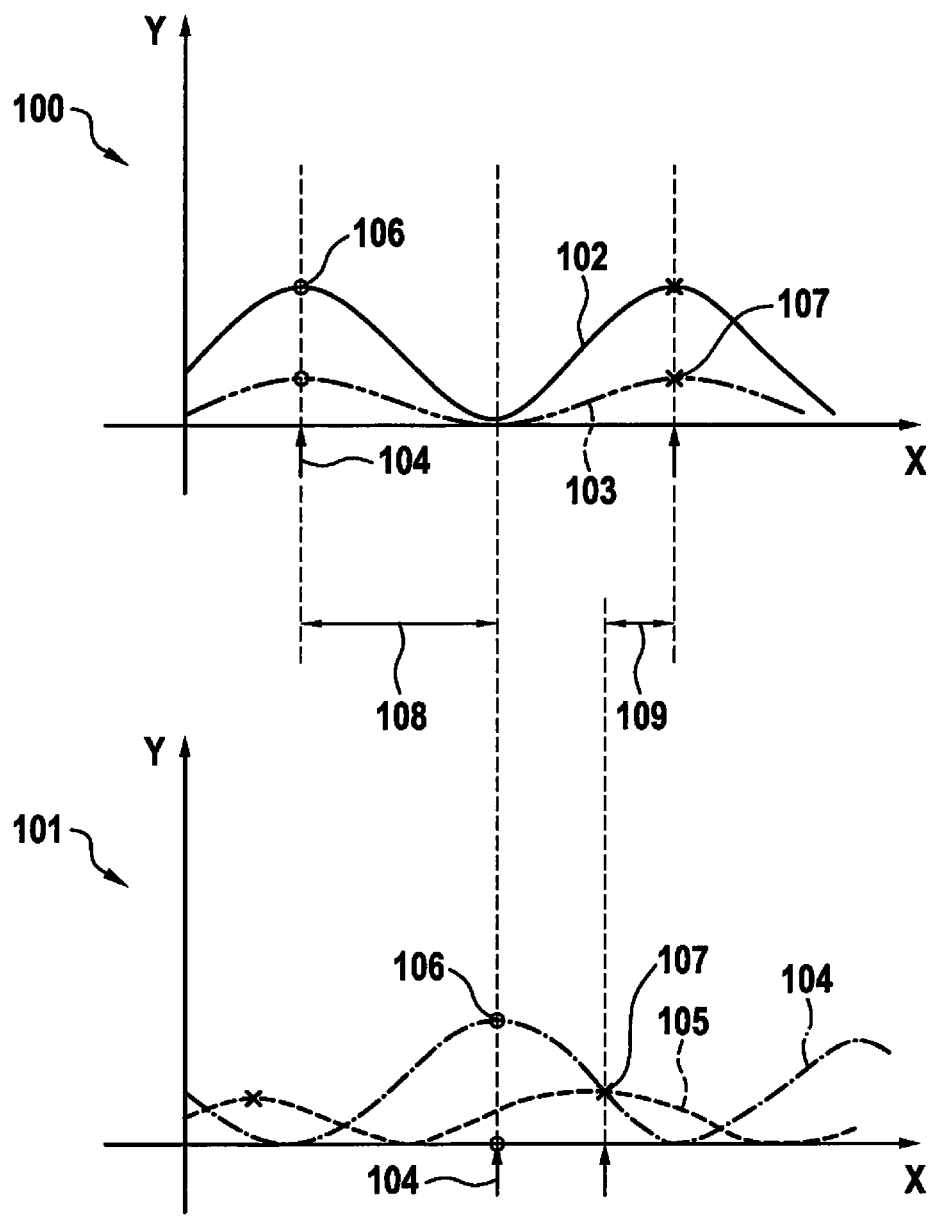
FIG. 2 shows an illustration by way of example of a polarization of the reflected scanning beam when it has been reflected on different objects.

FIG. 2 shows a top diagram 100 and a bottom diagram 101. A polarization of scanning beam 2 is illustrated in top diagram 100 and bottom diagram 101. The Y axis represents an intensity of scanning beam 2 for different polarization angles, which are depicted on the X axis.

Top diagram 100 illustrates a polarization of scanning beam 2 when it has been reflected on a license plate of a vehicle. A polarization of scanning beam 2 is not changed during the reflection of scanning beam 2 on the license plate. A first curve 102 illustrated in first diagram 100 thus depicts a polarization of scanning beam 2 at transmitting unit 20, and at the same time, at receiving unit 30. However, it is understood that an amplitude of the illustrated signal at receiving unit 30 is smaller than at transmitting unit 20. This similarly applies for a second curve 103, likewise illustrated in top diagram 100. First curve 102 and second curve 103 differ in that a different reflection angle was present during the reflection of scanning beam 2 on the license plate. It is apparent that the polarization of reflected scanning beam 2 is not a function of this angle.

Bottom diagram 101 illustrates a polarization of scanning beam 2 when it has been reflected on a license plate or a traffic sign.

A polarization of scanning beam 2 is changed when scanning beam 2 is reflected on the traffic sign. Scanning beam 2 had the same polarization at transmitting unit 20 as also illustrated in top diagram 100. A third curve 104 illustrated in first diagram 100 thus depicts a polarization of scanning beam 2 at transmitting unit 2. This similarly applies for a fourth curve 105, likewise illustrated in bottom diagram 101. Third curve 104 and fourth curve 105 differ in that a different reflection angle was present at the traffic sign during the reflection of scanning beam 2. It is apparent that the polarization of reflected scanning beam 2 has been changed in both cases.

In the case of bottom diagram 101, it is apparent that a polarization shift has occurred. Thus, a polarization maximum 106, 107 in bottom diagram 101 is situated at a different position on the X axis than is the case in top diagram 100. For first curve 102, this shift is illustrated by a first arrow 108, and for second curve 103, by a second arrow 109.

It is thus apparent that, based on the polarization of reflected scanning beam 2, it may be recognized whether the reflecting object is a license plate, as in the case of top diagram 100, or a traffic sign, as in the case of bottom diagram 101.

To ascertain the object property, a plurality of data records is stored in evaluation unit 32, in which an object property is associated with a polarization difference, i.e., a difference between the polarization that is set by transmitting unit 20 and the polarization that is recognized by receiving unit 30. Instantaneously detected polarization differences are compared to the polarization differences stored in the data records, and a data record is selected that includes this polarization difference. The object property associated with this data record is provided.

Evaluation unit 32 is also configured to ascertain the polarization parameter based on the polarization differences between two adjacent points 41, 42 from the surroundings of LIDAR system 1. As is apparent from FIG. 1, scanning beam 2 has a different, alternating polarization during the detection of first through fifth points 41 through 45. In each case, those points of object 40 that have been scanned with a different polarization of scanning beam 2 are situated next to one another. Since the adjacent points are close to one another, it may be assumed that they belong to the shared object 40. Thus, for example, first point 41 and second point 42 are combined into one point for which a single polarization parameter is determined. This results from the polarization difference of first point 41 and the polarization difference of second point 42. The polarization parameter may also be a two-dimensional value, for example a vector. Thus, information concerning a polarization difference for the area of first point 41 and of second point 42 is detected, reflection properties being detected with regard to different polarization directions for this shared area. In this way, a surface property of object 40 may be described in a particularly accurate manner via the polarization parameter.

Figure 3:
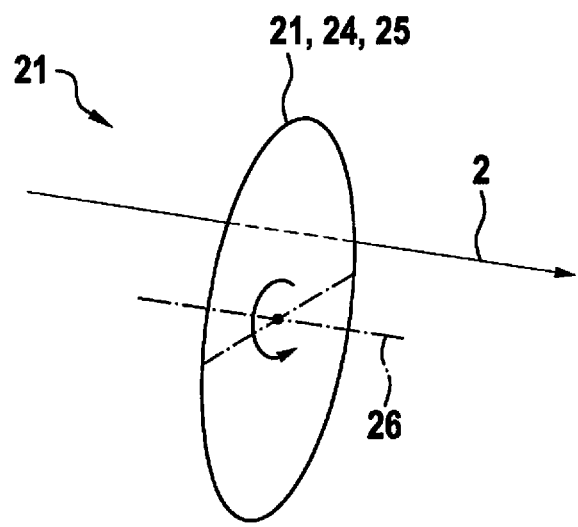
FIG. 3 shows a schematic illustration of a polarization device that includes a movable element.

FIG. 3 shows polarization device 21 according to a second specific embodiment of the present invention. Polarization device 21 includes a movable element 25 through which scanning beam 2 passes. Movable element 25 is a rotating polarization filter 24 that rotates about an axis 26. A polarization of scanning beam 2 is thus continuously changed.

Figure 4:
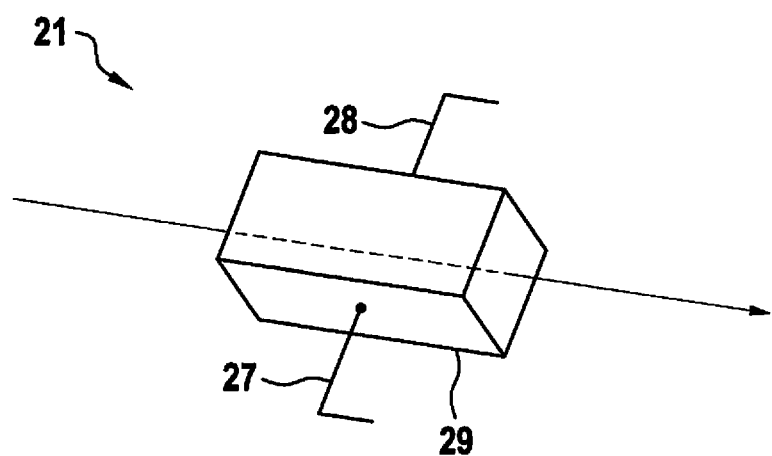
FIG. 4 shows a schematic illustration of a polarization device that includes a Pockels cell.

FIG. 4 shows a polarization device 21 according to a third specific embodiment of the present invention. Polarization device 21 includes a Pockels cell 27. A control voltage is applied to Pockels cell 29 via a first contact 27 and a second contact 28. Scanning beam 2 passes through Pockels cell 29, and its polarization is changed according to the voltage that is applied between first contact 27 and second contact 28.

In addition to the above written disclosure, reference is explicitly made to the disclosure in FIGS. 1 through 4.

What is claimed is:

1. A LIDAR system, comprising:
  a transmitting unit that includes a polarization device, the polarization device being configured to set a polarization of a scanning beam;
  a receiving unit that is configured to receive the scanning beam after it has been reflected on a point in the surroundings of the LIDAR system;
  the receiving unit including a polarization recognition device that is configured to recognize a polarization of the reflected scanning beam; and
  an evaluation unit that is configured to ascertain a polarization difference, based on a difference between the polarization set by the transmitting unit and the polarization recognized by the receiving unit.

2. The LIDAR system of claim 1, wherein the evaluation unit is configured to ascertain a surface property, based on the polarization difference.

3. The LIDAR system of claim 1, wherein the transmitting unit sets the polarization of the scanning beam to a first polarization and to a second polarization in a temporal sequence.

4. The LIDAR system of claim 1, wherein the evaluation unit is configured to associate a polarization parameter, which describes the polarization difference, with the point in the surroundings of the LIDAR system on which the scanning beam has been reflected.

5. The LIDAR system of claim 4, wherein the evaluation unit is configured to ascertain the polarization parameter, based on the polarization differences between two adjacent points, from the surroundings of the LIDAR system.

6. The LIDAR system of claim 1, wherein the polarization device includes a polarization filter, a Pockels cell, or a lambda quarter-wave plate to set the polarization of the scanning beam.

7. The LIDAR system of claim 1, wherein the polarization device includes a movable element through which the scanning beam passes, the movable element being moved with respect to the scanning beam in order to set the polarization of the scanning beam.

8. The LIDAR system of claim 1, wherein the polarization device is a component having a variable thickness, one area having a first thickness and one area having a second thickness being situated next to one another, and/or the polarization device is a component that includes different coatings, an area with a first coating being situated next to an area with a second coating or an uncoated area.

9. The LIDAR system of claim 1, wherein the polarization recognition device includes a polarizing beam splitter.

10. The LIDAR system of claim 1, wherein the evaluation unit is configured to carry out a grouping of points detected in the surroundings of the LIDAR system, based on the polarization parameter associated with the points.

11. A method for operating a LIDAR system, the method comprising:

setting a polarization of a scanning beam of the LIDAR system;
receiving the scanning beam after it has been reflected on a point in the surroundings of the LIDAR system;
recognizing a polarization of the reflecting scanning beam; and
ascertaining a polarization difference based on a difference between the set polarization of the scanning beam and the recognized polarization of the scanning beam, which the scanning beam has after it has been reflected on a point in the surroundings of the LIDAR system.

\* \* \* \* \*